W. S. WHITE.
FLUSHING VALVE.
APPLICATION FILED JUNE 4, 1914.
1,207,353.
Patented Dec. 5, 1916.
3 SHEETS—SHEET 3.
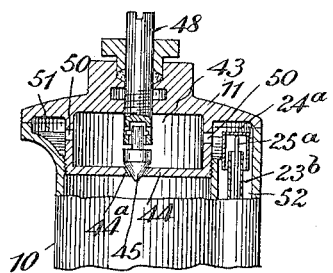
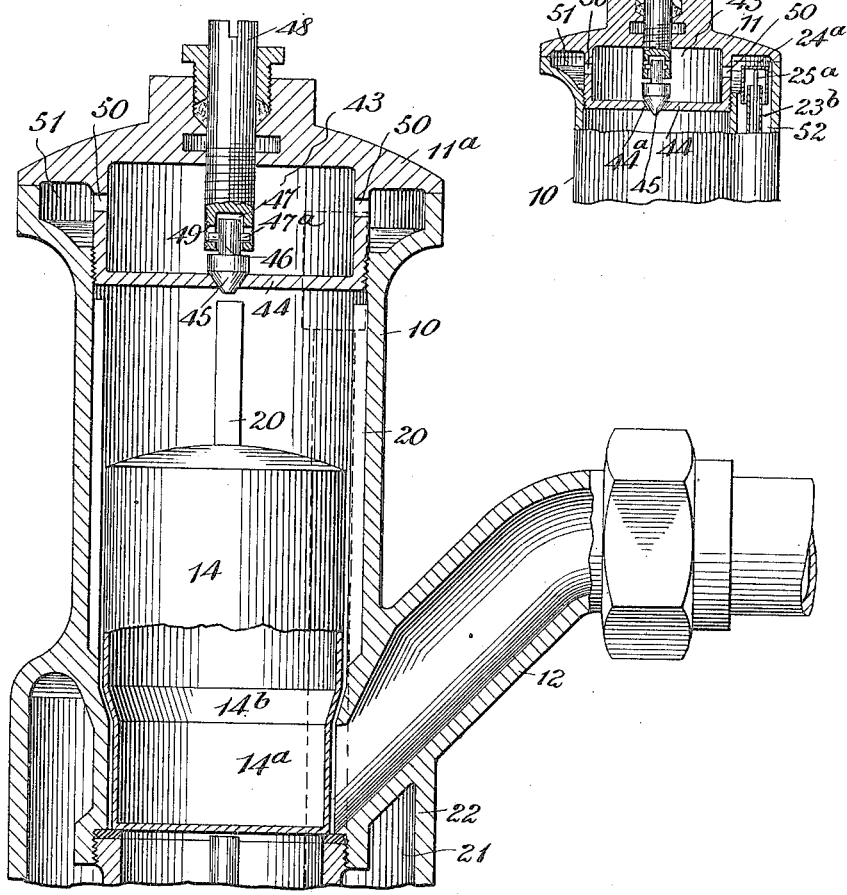
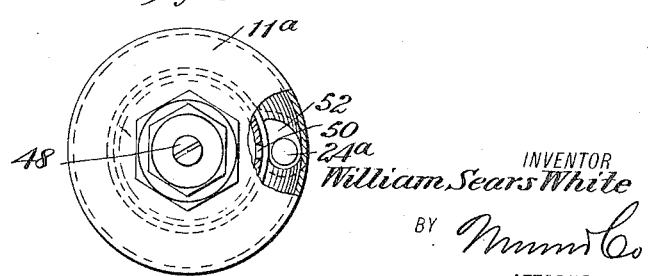
INVENTOR
William Sears White
BY
ATTORNEYS

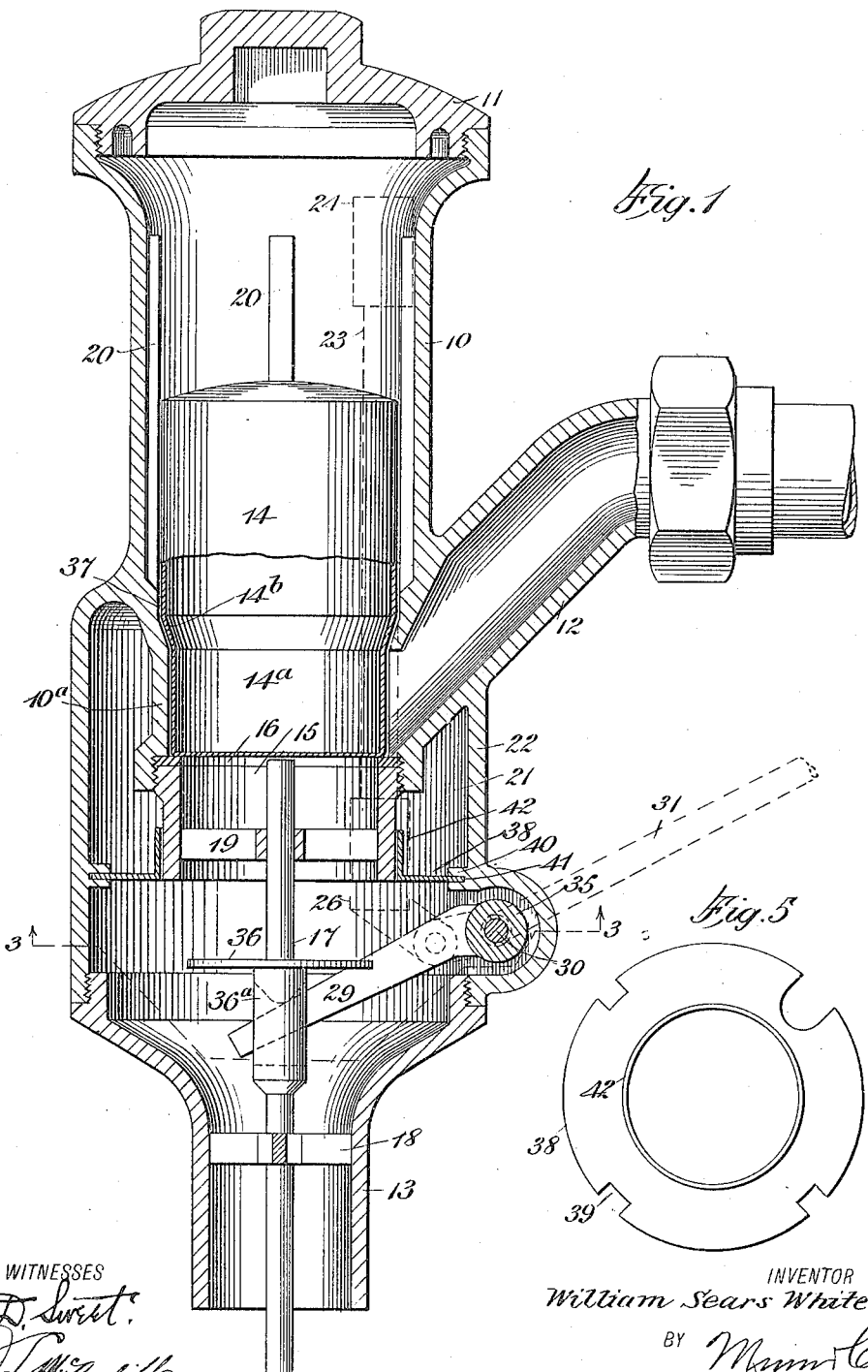

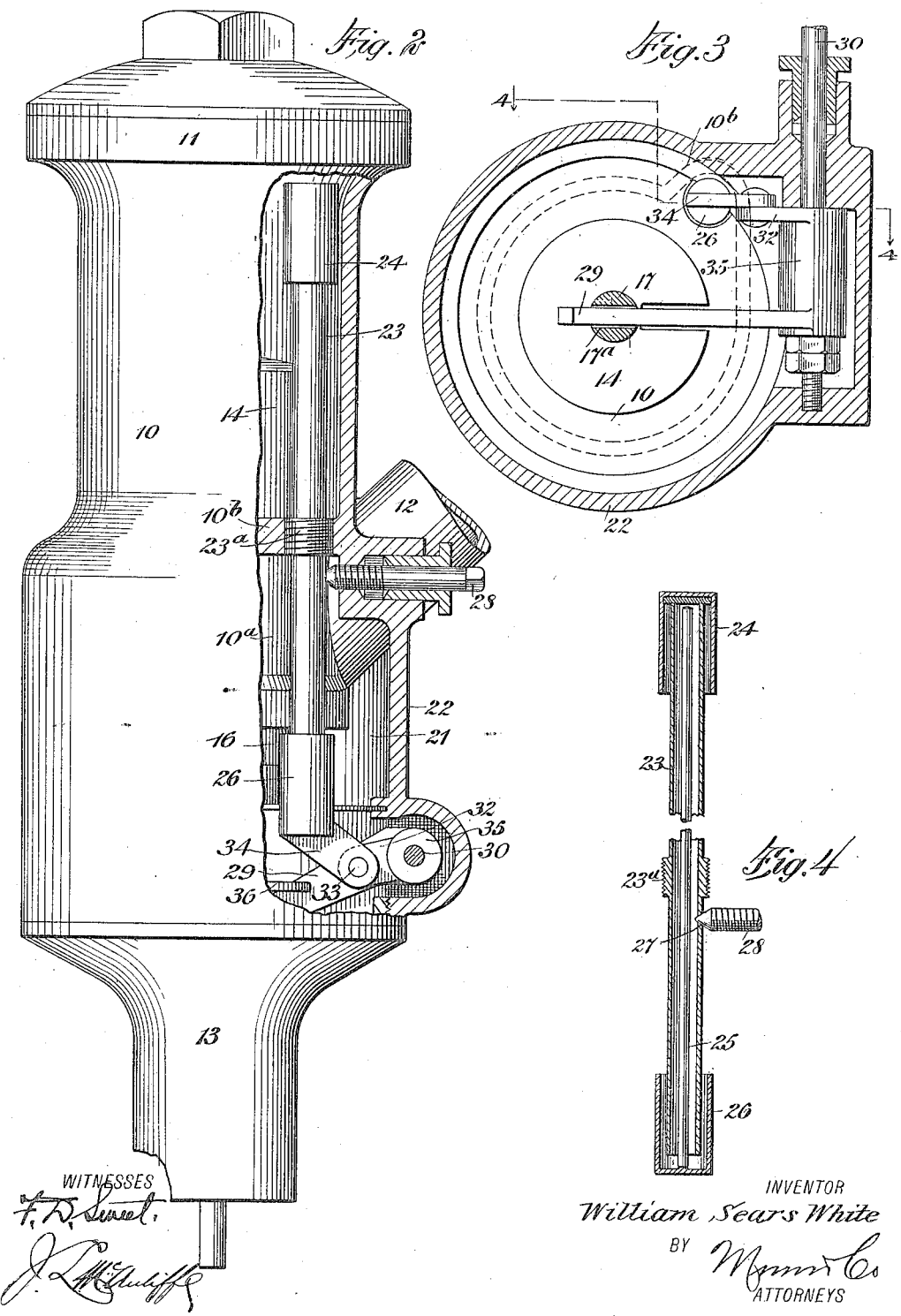

UNITED STATES PATENT OFFICE.

WILLIAM SEARS WHITE, OF DENVER, COLORADO, ASSIGNOR, BY DIRECT AND MESNE ASSIGNMENTS, TO WHITE FLUSHING VALVE MANUFACTURING COMPANY, OF DENVER, COLORADO, A CORPORATION OF COLORADO.

FLUSHING-VALVE.

1,207,353.

Specification of Letters Patent.

Patented Dec. 5, 1916.

Application filed June 4, 1914. Serial No. 842,898.

*To all whom it may concern:*

Be it known that I, WILLIAM SEARS WHITE, a citizen of the United States, and a resident of Denver, in the county of Denver and State of Colorado, have invented a new and Improved Flushing-Valve, of which the following is a full, clear, and exact description.

My invention has for objects to provide a flushing valve, the parts of which are so constructed and arranged as to maintain their form and adjustment under wear in order to maintain the device in efficient working condition; to provide a float valve operating in a reservoir in connection with which provision is made for maintaining an air cushion, whereby to prevent water hammer or jar in the operation of the valve; to provide in connection with the flushing valve, means for varying the period of flushing as desired; and to provide a construction that will insure a proper flushing action and the refill of the bowl or other fixture after flushing.

In carrying out the invention a reservoir or container is provided having an inlet and an outlet, communication between which inlet and outlet is commanded by a float valve. An air chamber is provided, which in the interest of compactness and economy of manufacture, may be directly associated with the reservoir structure. The air chamber communicates with the reservoir or float chamber, and the communication between the two is such that in the operation of the valve the float chamber will be vented to permit the flow of water thereinto as the float valve opens, and whereby as the float valve closes, air may pass from the air chamber to the float chamber as the water flows from the latter. After the closing of the float valve and the cutting off of the inlet of water, the remaining water in and below the air chamber will serve for the refill of the bowl or other fixture.

The invention will be particularly explained in the specific description following.

Reference is to be had to the accompanying drawings forming a part of this specification, in which similar characters of reference indicate corresponding parts in all the views.

Figure 1 is a vertical section of a flushing valve constituting one embodiment of my invention; Fig. 2 is a side elevation with parts broken away; Fig. 3 is a transverse section on the line 3—3 of Fig. 1; Fig. 4 is a detail vertical section of the means for establishing communication between the reservoir and air chamber, the section being indicated by the line 4—4 Fig. 3; Fig. 5 is a plan view of a device to prevent a violent disturbance of the air in the air chamber; Fig. 6 is a vertical section of the upper portion of my valve illustrating a modification; Fig. 7 is a fragmentary view of the upper end of the structure shown in Fig. 6, with parts in vertical section in a plane removed about 45° from the sectional plane in which Fig. 6 is taken; and Fig. 8 is a plan view of the elements shown in Fig. 7.

In constructing the illustrated form of the invention, a reservoir, container, or float chamber 10 is provided, preferably cylindrical, which may be closed at the top by a removable cap 11 to give access to the interior. An inlet 12 leads to the interior of the reservoir, and an outlet 13 is provided at the bottom to be connected in practice, with a bowl or other fixture. A float valve 14, usually cylindrical like the reservoir 10, has guided movement in the reservoir and commands the inlet 12.

The seat for the float valve may consist of a gasket 16 on a detachable tubular extension 15, secured to the lower end of the reservoir 10. To lift the valve 14 from its seat a vertically movable stem or trip rod 17 is provided, to be actuated in the manner hereinafter explained. The trip rod 17 moves in suitable guides, here shown as a spider 18 in the outlet 13 and a spider 19 in the extension 15. The interior of the reservoir may have vertical ribs 20 to guide the float 14 and provide for the passage of water around the float.

An air chamber is provided, which in the present instance, is associated directly with the lower end of the reservoir 10, there being a tapering shell 22 on said reservoir outside of the lower end $10^a$ of the reservoir and the extension 15. An annular air chamber or air lock is thus provided which is open at its lower end and closed at its upper end.

In order to establish communication between the upper portion of the reservoir 10 and the air chamber 21 in the construction shown, a tubular conduit 23 is provided at a side of the reservoir 10. The said conduit may have a boss or enlargement 23ª which is threaded into a lateral member 10ᵇ on the reservoir. The upper open end of the conduit 23 is commanded by a check valve 24, preferably in the form of an inverted cup fitting over and concentric with the conduit, so that the said valve may assume a raised position to uncover the conduit. I provide means to raise the check valve 24 when the float valve 14 is raised. The means in the present instance consists of a spindle 25, disposed axially within the conduit 23 and carrying a cup 26 at its lower end to constitute a water seal for the lower end of the conduit. A lateral orifice 27 in the side of the conduit 23 is commanded by a needle valve 28.

The illustrated means for actuating the trip spindle 17 for raising the float valve 14, and the means for simultaneously actuating the trip spindle 25 of the check valve 24 are as follows: An arm 29 is arranged to be vertically rocked by a rock shaft 30 provided with any suitable lever 31 or the like, and said oscillating arm 29 engages in an opening or slot 17ª in the trip spindle 17. Connection is made between the trip spindle 25 of the check valve 24 and the rock shaft 30 by means of a rocker arm 32 on said shaft, which is pivoted as at 33, to an arm 34 on the cup 26 of said spindle 25. Both the arm 29 and the arm 32 may be formed on a sleeve 35 suitably secured to the shaft 30. It will be obvious that the shaft 30 may be rocked to give an upward movement to the trip stems 25 and 17. The movement will cause the check valve 24 to be opened for venting the upper portion of the reservoir or float chamber.

On the trip stem 17 is a disk or other equivalent element 36, which, as the said stem is raised to lift the float valve 14, will be carried to a position to obstruct the lower end of the passage formed by the tubular extension 15, and cause the water from the inlet 12 to flow upward into the reservoir 10 as the float valve is raised. Thus the air will be forced out of the reservoir and be replaced by water, the overflow of the water passing through the conduit 23, in addition to more or less of the water passing around the obstructing disk 36. Upon release of the lever 31 the obstructing disk 36 and the trip stem 17 will drop, and also the trip stem 25 of the check valve 24. The water may now flow from the reservoir 10 through the passage 15 to the discharge outlet 13 and the check valve 24 will automatically open to permit air to flow from the air chamber or air lock 21 to the top of the reservoir. Thus the discharge of the water from the reservoir will permit the float valve to drop to its seat and cut off the inlet 12, the water remaining below the air lock and otherwise in the fitting being sufficient for the refill of the bowl or other fixture.

It is to be noted that the air chamber 21 will be sealed at its lower end by the flushing water and that except for its said open lower end and the passage 23, the air chamber is cut off from the atmosphere. The said passage 23 is also cut off from the atmosphere except through the float chamber or reservoir and the air chamber. The result is the alternate passage of air between the air chamber and float chamber in the filling and emptying of the reservoir, and a supply of water is insured in the air chamber for the refilling of a bowl after flushing.

It will be obvious that the provision of the air cushion in the reservoir 10 will prevent water hammer and jar in the operation of the valve. It will be clear also that the needle valve 28 commanding the air inlet 27 leading from the air chamber 21 to the conduit 23, may be variously adjusted in order to vary the period of flushing, which will depend on the freedom with which air is admitted to the float chamber to facilitate the discharge of water from said chamber and the descent of the float valve.

I prefer to make the float valve of two diameters, the lower portion 14ª commanding the inlet 12 being reduced and fitting in a correspondingly reduced diameter of the reservoir 10, at the lower end 10ª thereof. A tapering intermediate zone 14ᵇ is provided between the enlarged upper end of the float and the said reduced lower end, and an annular passage 37 is provided in the reservoir around the said tapered zone and adjacent thereto. The annular passage 37 permits a limited flow of water from the inlet to the reservoir after the float valve has seated and cut off the inlet from the discharge. Thus a limited quantity of water will enter the float chamber, subject of course, to the pressure due to the check valve 24 being closed.

The result of inclining the inlet 12 to the vertical float chamber is that the water from the inlet is permitted to flow toward the outlet without having to make a sharp turn, whereas if the inlet were perpendicular to the movement of the float, the water from the inlet striking the opposite end of the chamber would flow in all directions before escaping from the outlet. The result would be an agitation of the contents of the float chamber, making the flushing period irregular, particularly under high pressure. The inclined inlet directs the water in but one direction, and the water passes through with a minimum disturbance of the contents of the float chamber.

In order to further guard against violent disturbances of the air in the air chamber or air lock 21, by the flushing water, I provide a guard 38 to prevent splashing of the water into the lower end of the air chamber. Said guard may consist, as shown best in Figs. 1 and 5, of a flat ring formed with peripheral recesses 39; the recesses accommodate retaining lugs 40 on the interior of the shell 22, so that the edge of the ring may be entered in grooves 41 in said lugs, by a partial turn of the guard 38. The said guard surrounds the extension 15 at the exterior and may have a neck or vertical flange 42 around the latter. The openings 39 permit a sufficient outflow of water from the air chamber 21 when the water overflows the reservoir 10 through the conduit 23. The said conduit, it will be observed, thus constitutes a by-pass from which water may escape through the cup 26.

Referring particularly to Figs. 6, 7 and 8, a construction is illustrated in which additional means is provided for regulating the flushing period. The float chamber 10, with the inlet 12 and float 14, are the same as in the first-described construction, as well as the elements 14$^a$, 14$^b$, 20, 21 and 22, together with the other described elements below the inlet. At the top of the float chamber, and preferably in connection with the cap 11$^a$ is an auxiliary chamber 43, the bottom 44 of which has an orifice 44$^a$ commanded by a check valve 45. The shank 46 of the check valve has guided movement in a recess 47 in the lower end of a regulating stem 48 extending upwardly through the cap 11$^a$. The transverse pin 47$^a$ extends through the shank 46, its ends having movement in a transverse opening 49 intersecting the recess 47. Lateral openings 50 extend through the side wall of the chamber 43 into an annular chamber 51. The upper end of the conduit 23$^b$ corresponding in all respects with the conduit 23, extends to the chamber 51, and is provided with an inverted cup 24$^a$ to be raised by the spindle 25$^a$ corresponding with the spindle 25. The space 52 surrounding the conduit 23$^b$ is isolated from the interior of the float chamber 10, it being understood that the conduit 23$^b$ is threaded in a partition 10$^b$ the same as in Fig. 2, since this part of the construction is the same as the one first described.

With the form shown in Figs. 6 to 8, as the water fills the float chamber it will lift the check valve 45 and flow into the chamber 43, then through the openings 50 to the annular chamber 51, and downward through the conduit 23$^b$. A small quantity of dead water will remain at all times in the space 52. When the float 14 falls, the water from the auxiliary chamber 43 will pass downward through the opening 44$^a$ to the float chamber, permitting air to enter through the conduit 23$^b$ and openings 50.

It will be seen that by adjusting the stem 48 to regulate the opening between the valve 45 and its seat in the opening 44$^a$, the period of flushing can be regulated, in addition to the regulation due to the needle valve 28, or as a substitute for the latter. These means for regulating the flushing period, it will be understood, are given merely as two examples for the purpose.

Having thus described my invention, I claim as new, and desire to secure by Letters Patent:

1. A flushing valve having an inlet for water, a water outlet, a float chamber in communication with said inlet and outlet, a float valve in the float chamber controlling communication between the inlet and the float chamber and between the float chamber and the outlet, an air chamber normally closed from communication with the float chamber, and means whereby to raise the float valve and to establish communication between the top of the float chamber and air chamber with the raising of the float valve.

2. A flushing valve having a water inlet, a water outlet, a float chamber, a float valve in said chamber commanding communication between the inlet and said chamber and between the said chamber and the said outlet, a normally closed by-pass between the top of the float chamber and the outlet, and means for raising the float valve and opening the by-pass.

3. A flushing valve having a water inlet, a water outlet, a float chamber in communication with the inlet, a manually controlled float valve in the float chamber commanding the inlet, an air chamber in communication at the bottom thereof with the outlet, a by-pass conduit connecting the top of the float chamber with the air chamber, valve means associated with the by-pass to permit overflow of water from the float chamber and permit inflow of air from the air chamber, and means to open the valve means of the by-pass when the float valve is to be raised, the said air chamber being closed except for the said open lower end and the said by-pass.

4. A flushing valve having a water inlet, a discharge outlet, a float chamber to which the inlet leads, said chamber being open at its lower end in the direction of the discharge outlet, a float valve in the chamber commanding the inlet and commanding the discharge from the said chamber, means for raising the float valve, and valve means operable with the raising of the float valve for venting the float chamber.

5. A flushing valve having a water inlet, a discharge outlet, a float chamber in communication with the said inlet for the admission of water thereto, and in communication with the said outlet for the discharge of water, a float valve in said chamber commanding the inlet, an air chamber subjacent the float chamber, a passage connecting the air chamber with the float chamber near the top of the latter, and means for regulating the size of the inlet of the passage to vary the flushing period by controlling the descent of the float valve, the air chamber being closed except at its lower end.

6. A flushing valve having a water inlet, a float chamber to which the inlet leads, a discharge outlet from which water may flow from the float chamber, a float valve commanding both the said inlet and outlet means for raising the float valve, means operable with the valve-raising means to obstruct the passage of water from the float chamber to the said outlet, a by-pass conduit leading from the upper portion of the float chamber in communication with the outlet, a valve commanding the out-flow from the reservoir through the by-pass, and operating means for opening the latter valve and actuating means common to both the said valve operating means and the means for raising the float valve.

7. A flushing valve comprising an inlet, a discharge outlet, a float chamber to which water may flow from the inlet, a float valve commanding the inlet, a separate air chamber subjacent the float chamber, a by-pass extending from the air chamber upwardly to the upper portion of the float chamber, said by-pass both affording an out-flow of water from the float chamber and permitting the alternate passage of air between the air chamber and float chamber, a valve commanding the said by-pass, and means for raising the float valve and opening the valve of the by-pass.

8. A flushing valve comprising an inlet, a discharge outlet, a float chamber in communication with the inlet, a float valve in said chamber commanding the inlet, an air chamber below the float chamber, a conduit forming a by-pass from the upper portion of the float chamber to the air chamber, a check valve closing the upper end of the said by-pass, the said by-pass having an air inlet from the air chamber, and being cut off from the atmosphere except through the said air chamber and float chamber, and means for raising both the float valve and the check valve.

9. A flushing valve having an inlet, a discharge outlet, a float chamber in communication with the inlet, an air chamber below the float chamber, a by-pass conduit opening at its upper end into the upper portion of the float chamber and closed at its lower end by a water seal, said by-pass having an air inlet from the air chamber, and being cut off from the atmosphere except through the said air chamber and float chamber, a valve commanding the upper end of the conduit, and means for raising the float valve and for opening the valve of the conduit.

10. A flushing valve having an inlet for water, a discharge outlet, a float chamber in communication with said inlet and outlet, a float valve in the float chamber commanding the inlet, an auxiliary chamber above the float chamber, means for regulating the communication between the float chamber and the said auxiliary chamber, an air chamber normally closed from communication with the auxiliary chamber, and means whereby to raise the float valve and to establish communication between the air chamber and the float chamber by way of the auxiliary chamber when the float valve is raised.

In testimony whereof I have signed my name to this specification in the presence of two subscribing witnesses.

WILLIAM SEARS WHITE.

Witnesses:
ROBT. NAPIER,
ROBERT B. HALEY.

Copies of this patent may be obtained for five cents each, by addressing the "Commissioner of Patents, Washington, D. C."